United States Patent
Kuhns et al.

(10) Patent No.: US 7,153,536 B2
(45) Date of Patent: Dec. 26, 2006

(54) METHOD FOR PREPARATION OF A FOOD SAUCE

(75) Inventors: Barbara Ann Kuhns, Lowell, MA (US); Colin Brian Pace, Lowell, MA (US)

(73) Assignee: Welch Foods Inc., A Cooperative, Concord, MA (US)

( * ) Notice: Subject to any disclaimer, the term of this patent is extended or adjusted under 35 U.S.C. 154(b) by 59 days.

(21) Appl. No.: 10/659,908

(22) Filed: Sep. 11, 2003

(65) Prior Publication Data

US 2004/0208976 A1   Oct. 21, 2004

Related U.S. Application Data

(63) Continuation-in-part of application No. 10/417,473, filed on Apr. 15, 2003, now abandoned.

(51) Int. Cl.
*A23L 1/0524* (2006.01)
*A23L 1/064* (2006.01)
*A23L 1/39* (2006.01)

(52) U.S. Cl. ............................ 426/577; 426/589
(58) Field of Classification Search ............ 426/573, 426/589, 577, 615
See application file for complete search history.

(56) References Cited

U.S. PATENT DOCUMENTS

| | | | | |
|---|---|---|---|---|
| 2,605,188 | A * | 7/1952 | Baker | 426/577 |
| 2,629,665 | A * | 2/1953 | Gordon | 426/548 |
| 2,910,365 | A * | 10/1959 | Olliver | 426/577 |
| 3,185,576 | A * | 5/1965 | Ross | 426/577 |
| 3,367,784 | A * | 2/1968 | Waitman et al. | 426/577 |
| 3,556,810 | A * | 1/1971 | Moirano | 426/573 |
| 4,140,807 | A * | 2/1979 | Braverman | 426/573 |
| 4,370,354 | A | 1/1983 | Leipold | |
| 4,430,349 | A * | 2/1984 | Malone et al. | 426/34 |
| 5,738,897 | A | 4/1998 | Gidley et al. | |
| 5,820,903 | A * | 10/1998 | Fleury et al. | 426/74 |
| 6,024,994 | A | 2/2000 | Jacobson et al. | |
| 6,077,557 | A | 6/2000 | Gordon et al. | |
| 6,106,883 | A | 8/2000 | Sokolik et al. | |
| 6,235,320 | B1 * | 5/2001 | Daravingas et al. | 426/34 |
| 6,242,020 | B1 | 6/2001 | Jacobson et al. | |
| 2002/0012735 | A1 | 1/2002 | Mikla et al. | |
| 2002/0022078 | A1 | 2/2002 | Gordon et al. | |
| 2002/0119941 | A1 | 8/2002 | Ni et al. | |
| 2003/0211218 | A1 * | 11/2003 | Cote et al. | 426/583 |

OTHER PUBLICATIONS

Jam Today! With Pomona's Universal Pectin. First published May 1, 2001[retrieved from Internet Dec. 22, 2004] URL<www.permaculture.net/Pomona>.*
Brady, Pamela. "Uncooked Jams and Jellies". First published Feb. 21, 2001 [retrieved from Internet Dec. 20, 2004] URL<http://www.uaex.edu/Other_Areas/publications/HTML/FSHED-54.asp>.*
Cathy's Corner. First published Oct. 27, 2001 [retrieved from Internet Dec. 22, 2004 ]. URL<http://www.cathysbulkfoods.com/CornerOutput.cfm?ComNumber=C009>.*
Frank, Paula. "Fruit Sauces and Condiments". Aug. 2000 [ retrieved from Internet Dec. 22, 2004]. URL<http://www.foodproductdesign.com/archive/2000/0800ap.html>.*
NDSU Extension Service "Making Jam and Jelly from Frozen Fruit". Last revised Apr. 1995 [retrieved from Internet Dec. 21, 2004]. URL<http://www.ext.nodak.edu/extnews/askext/jamjelly/4343.htm>.*

* cited by examiner

*Primary Examiner*—Arthur L. Corbin
(74) *Attorney, Agent, or Firm*—Carstens & Cahoon, LLP; Colin P. Cahoon

(57) ABSTRACT

A method for preparation of a food sauce having a fresh fruit suspension. The method disclosed by the invention involves manipulating the pre-gel of a low methoxyl pectin by various processing steps and ingredient additions. The end product provides a sauce having a fresh fruit flavor with a unique texture and mouth feel.

12 Claims, 1 Drawing Sheet

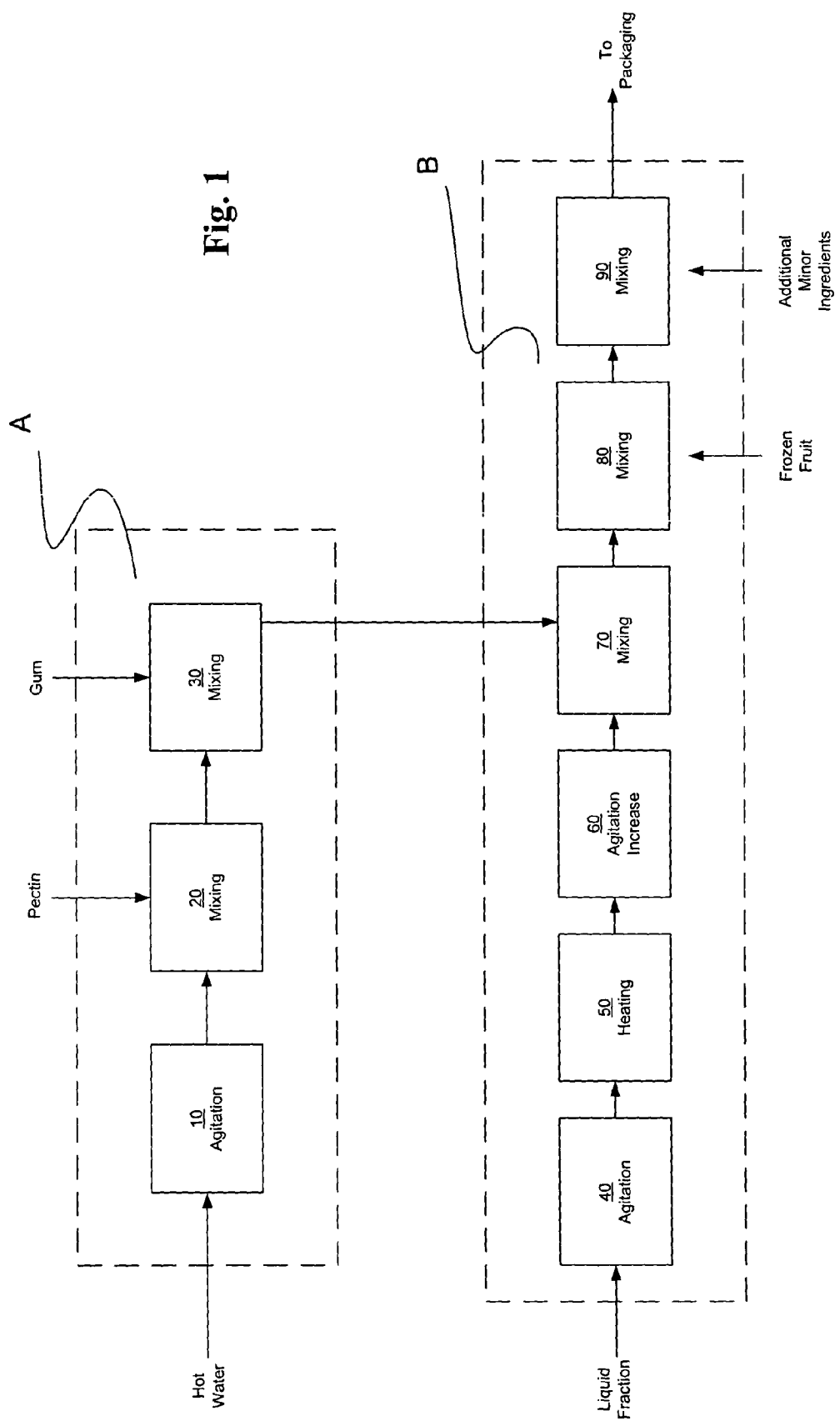

METHOD FOR PREPARATION OF A FOOD SAUCE

CONTINUATION-IN-PART

This application is filed as a continuation-in-part of application Ser. No. 10/417,473, filed on Apr. 15, 2003, now abandoned.

BACKGROUND OF THE INVENTION

1. Technical Field

The present invention relates to a method for suspending food particulates in a food sauce and, in particular, the suspension of fruit pieces in a sauce while preserving the fresh fruit presentation. The method can also be used to produce food products having a semi-fluid matrix with a pulpy, grainy, stringy, or beady texture. The method involves manipulating a low methoxyl pectin pre-gel by controlling various chemical and physical reactions.

2. Description of Related Art

Sauces containing a cooked fruit suspension are common in the prior art. These include various jam and jelly preparations, as well as other cooked fruit sauces, such as apple sauce, and other products containing fruit pieces in suspension. Typically, the fruit and a gelling agent are mixed at a high temperature in order to avoid the formation of a pre-gel prior to the introduction of fruit pieces into the mixture. As the entire mixture cools, the gelling agent begins to provide a media for the suspension of the cooked food particles. A gelation of the gelling agent prior to complete mixing of the final product is considered undesirable in the prior art, as such early gelation (or pre-gel) causes a lumpy texture, as opposed to a smooth texture, to the final product.

Pectins are frequently used as gelling agents in food products. Pectin is the methylated ester of polygalacturonic acid, and is generally divided into two categories of either high methoxyl pectin or low methoxyl pectin. Pectin is a long-chain molecule comprising a series of 300 to 1,000 rings of glalacturonic acid connected in a linear series. Some of these glalacturonic acid units are in the methyl ester form, while the other units are in the acid form. The ratio of the units found in the methyl ester form to the total units is expressed as a degree of methoxylation, or degree of esterification, which terms are typically abbreviated as "DM" or "DE," respectively. Any pectin having a DE of 50% or greater is considered a high methoxyl pectin, while any pectin having a DE of 50% or lower is considered a low methoxyl pectin. The two types of pectins have different gelling characteristics and, consequently, are used typically in different applications. For example, low methoxyl pectins are susceptible to gelation in the presence of divalent ions, such as calcium ions found in fruits. Conversely, high methoxyl pectin does not gel in the presence of divalent ions such as calcium.

As a consequence of low methoxyl pectins gelling reactivity with calcium, it is avoided in the prior art as a gelling agent for fruit suspensions. As noted by U.S. Pat. No. 4,370,354, titled "Stabilized Fruit Suspensions and Method for Preparing the Same," issued to Leipold (the '354 Patent), the use "of low methoxyl pectin as the gelling agent is attended by certain difficulties resulting from the fact that it is calcium sensitive and in the presence of calcium tends to form stiffer gels than are desired. One difficulty is that all fruits contain calcium." (Col. 1, lns. 27–31). As further noted in the '354 Patent, this difficulty can be overcome by adding an excess of calcium over the amount which can react with the pectin. This is done while the pectin is maintained at a high temperature such that the pectin fully reacts with the added calcium prior to the addition of the fruit to be suspended. The final mixture is then further cooked and then slowly cooled in order to avoid the formation of any pre-gel.

Low methoxyl pectins are desirable in many instances over high methoxyl pectins as a gelling agent, however, because high methoxyl pectins require as a condition for gellation a pH of 3.5 or lower and high solids. Typically, low methoxyl pectins can form a gel in a pH range of 1.0 to 7.0 or higher in a low to medium solids food product. Nonetheless, all of the prior art, including the '354 Patent, teaches that the low methoxyl pectin and fruit mixture must occur at a high temperature to avoid pre-gel.

Difficulties arise when it is desirable to produce a food sauce that has a fresh fruit taste and texture, as opposed to the cooked fruit taste and texture of jellies, jams, and other prior art fruit suspensions and sauces. The prior art teaches that low methoxyl pectin is a desirable gelling agent. However, the prior art further teaches that low methoxyl pectin must be kept at a high temperature, for example, above 150° F., throughout the preparation of the food sauce in order to avoid large lumps created by pre-gel. This elevated temperature cooks the fruit in situ and precludes the presentation of a fresh fruit sauce or suspension.

It would be desirable to develop one or more methods of producing a food sauce comprising, for example, an uncooked fruit suspension that gives a fresh fruit mouth feel and taste. Ideally, such process should allow for the use of a low methoxyl pectin as the primary gelling agent while controlling the pre-gel of the low methoxyl pectin in order to enhance the presentation of the final product. Further, the method should be susceptible to implementation by existing food technology equipment and provide for an economical method for producing a desirable food presentation.

SUMMARY OF THE INVENTION

The invention involves manipulation of a low methoxyl pectin during various steps of unit operations involved in producing a food sauce or fruit suspension. For the purpose of this application, the term "sauce" is intended to broadly describe a fluid, semi-fluid, or pliable solid matrix food, with a texture anywhere from smooth to coarse, which may or may not surround or cover particulates or other food items. Examples include, but are not limited to, marinara sauce, ketchup, mayonnaise, custard, salad dressings (vinegar or dairy based), gravy, hollandaise sauce, horseradish sauce, salsa, chutney, fruit or vegetable butter, compote, pickle relish, applesauce, chocolate sauce, jams, jellies, puddings, and gelled gelatin desserts.

The low methoxyl pectin is manipulated such as to control the formation of pre-gel and to allow for the addition of fruit or other particulates to the product admix without subjecting the particulates to prolonged exposure at elevated temperatures. The end result is a fresh-fruit or other particulate suspension providing a unique taste, texture, and mouth-feel. The invention is easy to implement using existing food technology equipment and provides an economical method for producing a desirable and unique food presentation.

In one embodiment of the invention, a low methoxyl pectin is hydrated in hot water by use of a high-shear mixer. A gum or acceptable thickener is added to the aqueous pectin solution. This admix is then mixed with a juice concentrates, puree, and a calcium solution then heated. Frozen fruit is then added to the mixture to cool the mixture and thaw the fruit. Finally, any other ingredients, such as flavor additives or preservatives, are added.

The method is adaptable to any number of fruit or food particle suspensions and can be adjusted to provide the desired texture, taste, and mouth feel of the end-product. The manipulated pectin gives the product a unique pulpy or grainy appearance and melts in the consumer's mouth. The method can be performed either in a batch process, semi-continuous process, or continuous process, depending on the equipment available and the desired manufacturing parameters. The invention is a substantial improvement over the prior art, which teaches that low methoxyl pectins cannot be used without cooking the fruit during processing.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 1 is a schematic flow chart of the method steps of a preferred embodiment of the invention.

DETAILED DESCRIPTION OF THE INVENTION

FIG. 1 is a schematic of the method steps of one embodiment of the invention. The method steps are generally broken up into two unit operations A, B. In the embodiment described, the first unit operation A takes place in a high-sheer mixer, such as a LDT-100 high-shear mixer manufactured by American Ingredients Company, Breddo Likwifier Division of Kansas City, Mo. 64111. The second unit operation B takes place in a jacketed batch kettle with an inclined agitator, such as a heavy duty 200-gallon "D9MSI" kettle manufactured by Process Systems & Equipment, Division of Lee Industries, Inc. of Philipsburg, Pa. 16866. While the invention is described below in reference to a batch operation, it should be understood that one skilled in the art could likewise practice the invention using in-line blending in order to perform a continuous or semi-continuous process.

Referring back to the first unit operation A, the process begins by the addition of hot water, preferably in the range of 40° F. to 200° F. and more preferably in the range of 140° F. to 170° F., to the high-shear mixer followed by a first agitation step 10. During this first agitation step 10, the hot water is subjected to agitation at a high-shear setting. The next step in the process involves a mixing step 20 in which a low methoxyl pectin is slowly added to the vortex created during the first agitation step 10. The preferred pectin added during the mixing step 20 is a low methoxyl pectin of medium calcium reactivity, such as a GENU LM Pectin, manufactured by C P Kelco of Wilmington, Del. The preferred ratio of the pectin to the hot water at this stage is in the range of 1:25 to 1:40. The pectin and hot water are then mixed during the mixing step 20 to the point that the pectin is substantially hydrated. A high-shear mixer is used during the mixing step 20 in order to promote uniform distribution of the pectin in solution. The elevated water temperature speeds the process of getting the pectin into solution as well. Given the equipment and preferred process parameters described above, this typically takes at least one minute before moving to the next mixing step 30.

In a preferred embodiment, a thickener, such as xanthan or similar gums, is then added during a second mixing step 30. The purpose of the thickener, which is optional to the invention, is to promote suspension of the fruit particles in the admix prior to gelation of the pectin. Other acceptable gums or thickeners may include, depending on the end-product desired, starches, proteins, guar gum, locust bean gum, konjac, carrageenan, gum arabic, agar, and carboxymethylcellulose. The xanthan used in a preferred embodiment is Keltrol Xanthan gum or Keltrol T Xanthan gum manufactured by CP Kelco of Wilmington, Del. The ratio of xanthan to pectin is dependent on the desired characteristics of the end-product and the composition and properties of the fruit to be maintained in suspension. However, preferred embodiment sauces of peaches, mixed berries, apples, and pears utilize a ratio by weight of xanthan to pectin in the range of about 1:4 to about 1:7, and more preferably in the range of about 1:5 to about 1:6. The thickener is mixed with the pectin and water solution for preferably between thirty seconds and two minutes, or just long enough to obtain a substantially complete dispersion of the thickener throughout the admix. It is important that all of the mixing times during the first unit operation A are adequate to disperse the pectin and thickener without over-shearing the ingredients.

Turning now to the second unit operation B, a liquid fraction, consisting in a preferred embodiment of juice concentrate, fruit puree, and a calcium solution, are added to a jacketed kettle. The calcium levels of the liquid fraction are preferably in the range of 20–100 milligrams of calcium per gram of pectin in the pectin solution, and is dependent on the degree of esterification of the pectin and desired degree of pre-gel. This liquid fraction is then thoroughly mixed during an agitation step 40. The agitation step 40 should, in a preferred embodiment, comprise a slow agitation of the mixture, just sufficient to promote heat transfer through the mixture and blending of all of the various ingredients.

The formation of pre-gel can be manipulated by varying the processing parameters of rate of pectin addition and kettle agitation. For example, the pre-gel formed with very slow agitation and high rate of addition produces large pre-gel, whereas a high agitation and slow addition produces small pre-gel. Other factors that affect the formation of pre-gel are pectin reactivity, calcium concentration, and temperature of both solutions. The preferred embodiment uses a pectin addition rate of approximately 2 gpm and an initial kettle agitation speed of 14–18 rpm. As the volume in the kettle increases, the agitation is increased to 20–25 rpm in order to minimize splashing. The ratio of addition rate (gallons) to agitation rate (rpm) should preferably be less than 1:5, more preferably between 1:5 to 1:15, and most preferably about 1:10.

The liquid fraction, after blending at the agitation step 40, is then heated during a heating step 50. It is critical that the heat addition during the heating step 50 occurs such that burn-on of any of the liquid fraction in the kettle is avoided. In the kettle previously described, using a 200-gallon kettle, the liquid fraction batch is preferably in the 40-gallon range. This batch volume keeps the liquid fraction level in the kettle below the steam jacket. By maintaining a liquid level below the steam jacket, burn-on can be more easily avoided. The liquid fraction is heated during the heating step 50 to a temperature above the gelation temperature of pectin (which is generally in the 140° F. to 150° F. range), but not high enough to induce any unfavorable cooking or burning of the liquid fraction. In the preferred embodiment described, the temperature obtained is approximately 160° F. after a gentle heating step 50 of between 20 to 30 minutes.

Once the desired temperature has been reached, the steam is turned off and the liquid fraction is subjected to an increased agitation step 60. The mix speed for this increased agitation step 60 is, for example, in the range of 12 to 30 rpm, but is specific to the particular agitator used.

The previously-described pectin solution is now added to the liquid fraction in the jacketed kettle during a mixing step 70. The duration of this mixing step 70 is relatively short, and is dependent on the speed of agitation, rate of addition, and batch size. Using the example embodiment described herein, the mixing step 70 is between 30 seconds and 5 minutes in duration, and should only be continued (prior to moving on to a second mixing step 80) until the solution looks homogenous with a gritty or grainy appearance. Once this characteristic of the solution has been attained, frozen fruit is added at a second mixing step 80. Frozen fruit is used as the additive at the second mixing step 80 in order to perform the dual function of cooling the mixture down while avoiding cooking of the fruit. The mixture is cooled while the fruit thaws, but the latent heat should be insufficient to cook the fruit further.

Additional minor ingredients, such as flavoring or preservatives, can be added at the final mixing step 90, or can be added concurrently with the addition of the frozen fruit at the previous mixing step 80. In the embodiment described, the admix attains a final temperature of between 50° F. to 60° F. after between 5 and 45 minutes of the addition of the frozen fruit at the second mixing step 80. Additional heating may be required to attain the final desired temperature. The product can then be packaged and refrigerated or further processed prior to packaging.

Using the processing parameters described above with regard to FIG. 1, several specific formulations have then been developed which provide a sauce having a fresh fruit suspension with a unique taste and mouth feel. A first example of a preferred embodiment is shown below in Table 1 which reflects the ingredients for a peaches suspension expressed by weight percentage.

TABLE 1

| Ingredient | Usage |
| --- | --- |
| White Grape Conc. (68% WSS) | 17.0% |
| Peach Puree | 10.0% |
| 30% Calcium Chloride Solution | 0.45% |
| 30% Potassium Sorbate Solution | 0.10% |
| Pectin | 1.20% |
| Xanthan Gum | 0.20% |
| Hot Water for Gum/Pectin | 30.43% |
| Peach Chunks | 40.0% |
| Added flavors | 0.12% |
| 30% Citric Acid Solution | 0.50% |
| TOTAL | 100.0% |

This peaches suspension provides a sauce with a flavor of slightly tart, fresh peaches. The color of the sauce is generally orange to yellow, and the sauce has a unique mouth feel, giving the impression of fresh fruit throughout.

The ingredients of a mixed berries embodiment of the present invention are described in Table 2 below:

TABLE 2

| Ingredient | Usage |
| --- | --- |
| White Grape Conc. (68% WSS) | 23.0% |
| 30% Calcium Chloride Solution | 0.55% |
| 30% Potassium Sorbate Solution | 0.10% |
| Pectin | 1.30% |
| Xanthan Gum | 0.25% |
| Hot Water for Gum/Pectin | 32.42% |
| Raspberry Puree, Strawberries, Blueberries, Cranberry Slices | 42.0% |
| Added flavors | 0.38% |
| TOTAL | 100.0% |

The mixed berries embodiment produces a sauce that is red to purple in color. The flavor of the mixed berries embodiment is a slightly tart combination of raspberry and blackberry.

The ingredients for a pears embodiment of the present invention are detailed in Table 3 below:

TABLE 3

| Ingredient | Usage |
| --- | --- |
| White Grape Conc. (68% WSS) | 5.0% |
| Pear Juice Conc. (70% WSS) | 10.0% |
| Pear Puree | 8.0% |
| 30% Calcium Chloride Solution | 0.5% |
| 30% Potassium Sorbate Solution | 0.10% |
| Pectin | 1.20% |
| Xanthan Gum | 0.20% |
| Hot Water for Gum/Pectin | 34.2% |
| Pear Chunks | 40.0% |
| Added flavors | 0.30% |
| 30% Citric Acid Solution | 0.50% |
| TOTAL | 100.0% |

The pears embodiment produces a sauce having a light beige color with a slightly tart flavor of fresh pears.

The ingredients of an apples embodiment of the present invention are shown in Table 4 below:

TABLE 4

| Ingredient | Usage |
| --- | --- |
| White Grape Conc. (68% WSS) | 5.0% |
| Apple Juice Conc. (70% WSS) | 7.5% |
| Apple Puree | 10.0% |
| 30% Calcium Chloride Solution | 0.45% |
| 30% Potassium Sorbate Solution | 0.10% |
| Pectin | 1.20% |
| Xanthan Gum | 0.20% |
| Hot Water for Gum/Pectin | 34.63% |
| Apple Chunks | 40.0% |
| Added flavors | 0.25% |
| 30% Citric Acid Solution | 0.67% |
| TOTAL | 100.0% |

The apples embodiment of the invention produces a sauce having a light beige color with a slightly tart flavor of fresh apples.

Tables 1 through 4 above list specific examples of one preferred embodiment of the invention. Each of the specific ingredients, however, can be adjusted or suitable substitutions made in order to accomplish the processing steps and goals of the invention. For example, Table 5 below provides product ranges that have been found acceptable for the purpose of producing a food sauce or food suspension in accordance with the processing steps of the preferred embodiment described herein.

TABLE 5

| Ingredient | Usage |
| --- | --- |
| Liquid sweetener (20%–80% WSS) (Sweeteners, stocks, purees, brine, etc.) | 1.0%–30% |
| Calcium source (which has at least "good" water solubility) | 0%–1.0% |
| LM Pectin | 0.5%–5.0% |
| Other thickener (Gum, starch, etc.) | 0.05%–10% |
| Water | Balance of formula |
| Particulates (Fruits, vegetables, meats, grains, etc.) | 5%–50.0% |
| Minor Ingredients (Flavors, preservatives, acids, salt, etc.) | 0%–4% |

While the invention has been particularly shown and described with reference to specific parameters or processing steps, it should be understood that these parameters can be adjusted in order to adjust the final characteristics of the fruit suspension or food sauce. Further, while the preferred embodiments have been described using specific fruit additives, it should be understood that the invention is applicable to a number of fruit mixtures such as peaches, strawberries, blueberries, cranberries, raspberries, blackberries, pears, grapes, apples, pineapples, apricots, mangoes, cherries, kiwi, bananas, and papaya, alone or in combination. While the invention is beneficial in fresh-fruit suspensions, since the added fruit is exposed to elevated temperatures for a relatively short time period, the invention can be used to suspend fruit pieces or particles that have been cooked in advance. In fact, the added fruit can be fresh, frozen, canned, or in any state prior to addition consistent with the teachings of the invention. Non-fruit food sauces and suspensions, such as vegetables, meats, and grains can be prepared using the invention as well. In fact, the invention can be used for the manufacture of any food product that requires the suspension of food particles of any shape and size. By manipulating various process steps and ingredients described herein, food products can be manufactured having a semi fluid matrix with a texture that can be described as pulpy, grainy, or beady, with a range of said texture from very subtle to pronounced.

We claim:

1. A method for preparation of a food sauce, said method comprising the steps of:

a) hydrating low-methoxyl pectin in water to form an aqueous pectin solution;

b) heating a calcium-containing liquid fraction to at least 140° F.;

c) mixing said aqueous pectin solution of step a) with the hot liquid fraction obtained from step b), wherein said liquid fraction comprises soluble calcium in the range of 20–100 milligrams of calcium per gram of pectin in said aqueous pectin solution; and d) adding a fruit component to the mixture obtained from step c), wherein said fruit component is maintained in the mixture at a temperature below which cooking of the fruit component will occur.

2. The method of claim 1 wherein the aqueous pectin solution of step a) is maintained at a temperature of about 140° F. to about 170° F.

3. The method of claim 1 wherein a thickener is mixed with the hydrated pectin prior to the mixing step c).

4. The method of claim 3 wherein the thickener comprises xanthan.

5. The method of claim 3 wherein the ratio by weight of thickener to pectin is about 1:4 to about 1:7.

6. The method of claim 1 wherein the liquid fraction of step b) further comprises a juice concentrate.

7. The method of claim 1 wherein the liquid fraction of step b) further comprises a fruit puree.

8. The method of claim 1 wherein the mixing step c) occurs at a temperature above the gelation temperature of the pectin in solution and continues until the mixture formed therefrom attains a homogeneous gritty or grainy appearance.

9. The method of claim 1 wherein the addition of the fruit at step d) reduces the temperature of the mixture to a point below which cooking of the fresh fruit will occur.

10. The method of claim 1 wherein the fruit added at step d) comprises a frozen fruit.

11. The method of claim 10 wherein the frozen fruit added at step d) comprises at least one frozen fruit component selected from the group consisting of peaches, strawberries, blueberries, cranberries, raspberries, blackberries, pears, grapes, apples, pineapples, apricots, mangoes, cherries, kiwi, bananas, and papaya.

12. The method of claim 1 wherein the aqueous pectin solution is added to the liquid fraction at a ratio of gallons per minute of aqueous pectin solution added to agitation rate of the mixing in rpm of between 1:5 and 1:15.

* * * * *